(12) United States Patent
Gorti et al.

(10) Patent No.: US 7,899,069 B2
(45) Date of Patent: *Mar. 1, 2011

(54) PRIORITY BASED BANDWIDTH ALLOCATION WITHIN REAL-TIME AND NON-REAL-TIME TRAFFIC STREAMS

(75) Inventors: Brahmanand Kumar Gorti, Cary, NC (US); Marco Heddes, Lawrence, MA (US); Clark Debs Jeffries, Durham, NC (US); Andreas Kind, Kilchberg (CH); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 12/114,767

(22) Filed: May 3, 2008

(65) Prior Publication Data

US 2008/0232386 A1 Sep. 25, 2008

Related U.S. Application Data

(63) Continuation of application No. 10/118,493, filed on Apr. 8, 2002, now Pat. No. 7,385,997.

(51) Int. Cl.
*H04L 12/28* (2006.01)
*H04L 12/56* (2006.01)
(52) U.S. Cl. ...................... 370/415; 370/412
(58) Field of Classification Search ................ None
See application file for complete search history.

(56) References Cited

U.S. PATENT DOCUMENTS 4,616,359 A  10/1986  Fontenot ............... 370/60
5,268,900 A  12/1993  Hluchy et al. ............ 370/429

(Continued)

FOREIGN PATENT DOCUMENTS

GB  2347833 A  9/2000

OTHER PUBLICATIONS

Office Action for U.S. Appl. No. 11/608,295 dated Apr. 1, 2010.

(Continued)

*Primary Examiner*—Ajit Patel
(74) *Attorney, Agent, or Firm*—Robert A. Voigt, Jr.; Winstead, P.C.

(57) ABSTRACT

A method and system for transmitting packets in a packet switching network. Packets received by a packet processor may be prioritized based on the urgency to process them. Packets that are urgent to be processed may be referred to as real-time packets. Packets that are not urgent to be processed may be referred to as non-real-time packets. Real-time packets have a higher priority to be processed than non-real-time packets. A real-time packet may either be discarded or transmitted into a real-time queue based upon its value priority, the minimum and maximum rates for that value priority and the current real-time queue congestion conditions. A non-real-time packet may either be discarded or transmitted into a non-real-time queue based upon its value priority, the minimum and maximum rates for that value priority and the current real-time and non-real-time queue congestion conditions.

8 Claims, 3 Drawing Sheets

U.S. PATENT DOCUMENTS

| | | | |
|---|---|---|---|
| 5,790,522 A | 8/1998 | Fichou et al. | |
| 5,884,037 A | 3/1999 | Aras et al. | 395/200.56 |
| 5,916,303 A | 6/1999 | Scott | 709/217 |
| 5,926,459 A | 7/1999 | Lyles et al. | 370/230 |
| 6,091,709 A | 7/2000 | Harrison et al. | 370/235 |
| 6,167,027 A | 12/2000 | Aubert et al. | 370/230 |
| 6,178,171 B1 | 1/2001 | Alexander, Jr. et al. | 370/395 |
| 6,188,670 B1 | 2/2001 | Lackman et al. | 370/231 |
| 6,212,162 B1 | 4/2001 | Hörlin | 370/229 |
| 6,212,582 B1 | 4/2001 | Chong et al. | 710/57 |
| 6,252,848 B1 | 6/2001 | Skirmont | 370/229 |
| 6,445,707 B1 * | 9/2002 | Iuoras et al. | 370/395.43 |
| 6,526,060 B1 * | 2/2003 | Hughes et al. | 370/395.4 |
| 6,577,596 B1 | 6/2003 | Olsson et al. | |
| 6,657,960 B1 | 12/2003 | Jeffries et al. | |
| 6,834,053 B1 | 12/2004 | Stacey et al. | 370/395.4 |
| 6,868,061 B1 | 3/2005 | Kilkki et al. | |
| 6,956,867 B1 | 10/2005 | Suga | |
| 7,120,113 B1 | 10/2006 | Zhang et al. | |
| 2002/0018469 A1 | 2/2002 | Davis | |
| 2004/0090974 A1 * | 5/2004 | Balakrishnan et al. | 370/412 |
| 2004/0160961 A1 * | 8/2004 | Duckering et al. | 370/395.4 |
| 2005/0175014 A1 * | 8/2005 | Patrick | 370/395.43 |
| 2005/0249114 A1 | 11/2005 | Mangin et al. | 370/229 |
| 2006/0133384 A1 * | 6/2006 | Shinohara | 370/395.4 |

OTHER PUBLICATIONS

Office Action for U.S. Appl. No. 11/608,295 dated Mar. 12, 2009.

* cited by examiner

PRIORITY BASED BANDWIDTH ALLOCATION WITHIN REAL-TIME AND NON-REAL-TIME TRAFFIC STREAMS

CROSS REFERENCE TO RELATED APPLICATIONS:

The present application is a continuation application of pending U.S. patent application Ser. No. 10/118,493, which was filed on Apr. 8, 2002, which is assigned to the assignee of the present invention. The present application claims priority benefits to U.S. patent application Ser. No. 10/118,493.

TECHNICAL FIELD

The present invention relates to the field of a packet switching network, and more particularly to implementing a real-time queue for storing real-time data and a non-real-time queue for storing non-real-time data thereby reducing the complexity of a scheduler.

BACKGROUND INFORMATION

A packet switching or routing network (referred to as a switching network henceforth) has switches used for transmission of data among senders and receivers connected to the network. The switching performed by these switches is in fact the action of passing on packets of data received by a switch to a further switch in the network. Such switching actions are the means by which communication data is moved through the packet switching network.

Each switch may include what is commonly referred to as a switch fabric configured to process packets between input and output packet processor. Each switch may further comprise one or more packet processors coupled to the switch fabric. The packet processors may further be configured to direct the incoming packets of data across the switch fabric to particular packet processors. Each packet processor may be configured to provide traffic to the switch fabric and accept traffic from the switch fabric. Each packet processor may further be configured to accept/transmit data from/to hosts, respectively. Thus, any host connected with one of the packet processors may communicate with another host connected to another packet processor.

Due to bottlenecks in processing in packet processors or in transferring traffic across the switch, data packets may be required to wait prior to being processed by a packet processor and transmitted to another packet processor or switch in the packet switching network. As a result, queues configured to temporarily store data packets may be implemented in the packet processor. Coupled to the queues may be mechanisms to enqueue the data packets into the queues. That is, the enqueuing mechanisms may be configured to insert the packets in the corresponding queues. It is noted that a portion or all of the queues may be part of the same physical memory resource.

Typically, packets are assigned a priority where the priority may be determined based on a value of particular bits in the packet header. The packets with a higher priority may be processed prior to the packets with a lower priority. After each particular interval of time, a scheduler in the packet processor may be configured to search through all the queues storing packets and identify the packet with the highest priority to be transmitted. However, in order for the scheduler to search through all the queues storing packets and identify the packet with the highest priority to be transmitted, the scheduler may be complex to implement such as by having multiple sub-queues and logic for identifying multiple priorities.

It would therefore be desirable to implement a simpler scheduler without the complexity in design of having multiple sub-queues and logic for identifying multiple priorities in order to identify the packet to be transmitted.

SUMMARY

The problems outlined above may at least in part be solved in some embodiments by prioritizing packets based on the urgency of processing them. Packets that are classified as being urgent to be processed may be referred to as real-time packets. Packets that are classified as not being urgent to be processed may be referred to as non-real-time packets. Real-time packets have a higher priority than non-real-time packets and hence may be processed prior to non-real-time packets. One queue ("real-time queue") may be designated to store real-time packets and another queue ("non-real-time queue") may be designated to store non-real-time packets. A scheduler coupled to both queues may then be configured to determine if there are any real-time packets in the real-time queue designated to real-time packets. If there are any real-time packets in the real-time queue, then the scheduler may be configured to select the next real-time packet in the real-time queue to be enqueued in anther queue for transmission. If there are no real-time packets in the real-time queue, then the scheduler may be configured to select the next non-real-time in the non-real-time queue to be enqueued in another queue for transmission. By storing the higher priority real-time packets in a separate queue than the lower priority non-real-time packets, the scheduler does not have to search through multiple sub-queues in the system to identify the packet with the highest priority as in prior art. Hence, the scheduler may be simpler in design than the scheduler in prior art.

In one embodiment of the present invention, a method for transmitting packets in a packet switching network may comprise the step of receiving a packet of data. The packet may be received by a packet processor in a switch in the packet switching network where the packet processor may be configured to process packets of data. The packet processor may comprise a flow control unit configured to receive the packet of data.

A determination may then be made by the flow control unit as to the time priority of the received packet. That is, a determination may be made by the flow control unit as to whether the received packet is a real-time packet or a non-real-time packet. Real-time packets may refer to packets that are classified as being "urgent" to be processed, e.g., packets containing data for voice, radio. Non-real-time packets may refer to packets that are classified as being "not urgent" to be processed, e.g., packets containing data for electronic mail, x-rays, backup data storage. Real-time packets have a higher priority than non-real-time packets and hence may be processed prior to non-real-time packets.

The flow control unit may further be configured to determine the value priority of the received packet. The value priority may refer to the rank or priority assigned to the class of packets that includes the received packet. Packets assigned a higher priority value with a particular time priority, e.g., real-time, non-real-time, may be processed by the packet processor preferentially to packets assigned a lower priority value with the same time priority.

The flow control unit may further be configured to direct the received packet to an appropriate flow controller in the packet processor. A flow controller may be configured to determine whether to discard or transmit the received packet as discussed below. Each flow controller in the packet processor may be associated with a particular class of packets assigned with a particular value priority and time priority, e.g., real-time, non-real-time. For example, one flow controller may be associated with a class of packets, e.g., packets containing voice data, with a value priority of 0 (the highest possible) and a time priority for real-time packets. Another flow controller may be associated with a class of packets, e.g., packets containing radio data, with a value priority of 1 (the second highest possible after value priority of 0) and a time priority for real-time packets. Another flow controller may be associated with a class of packets, e.g., packets containing x-ray data, with a value priority of 0 and a time priority for non-real-time packets. Another flow controller may be associated with a class of packets, e.g., packets containing electronic mail data, with a value priority of 1 and a time priority for non-real-time packets.

A determination may then be made by the appropriate flow controller as to whether to transmit or discard the received packet. If the appropriate flow controller determines to discard the received packet, then the received packet is discarded. If the appropriate flow controller determines to transmit the received packet, then the received packet is inserted in one of two particular queues, e.g., First-In-First-Out (FIFO) queues, in the packet processor. If the received packet is a real-time packet, then if the appropriate flow controller determines to transmit the received packet, the received packet is inserted in a queue referred to as a real-time queue. A real-time queue may refer to a queue configured to store real-time packets. If the received packet is a non-real-time packet, then if the appropriate flow controller determines to transmit the received packet, the received packet is inserted in a queue referred to as a non-real-time queue. A non-real-time queue may refer to a queue configured to store non-real-time packets.

A scheduler, coupled to the real-time queue and non-real-time queue, may select the next real-time packet to be transmitted if there are any real-time packets in the real-time queue. However, if there are no real-time packets in the real-time queue, then the scheduler may select the next non-real-time packet in the non-real-time queue to be transmitted if there are any non-real-time packets in the non-real-time queue. If there are no real-time packets in the real-time queue and no non-real-time packets in the non-real-time queue, then the scheduler may wait for the next real-time or non-real-time packet to be inserted in their respective queue. By storing the higher time priority real-time packets in a separate queue than the lower time priority non-real-time packets, a simpler scheduler may be designed that does not have to search through multiple sub-queues to identify the packet with the highest priority as in prior art. Instead, the scheduler may simply select the next packet to be serviced from either the real-time queue or the non-real-time queue.

The packet selected may then be enqueued in another queue for transmission to another switch, to the switch fabric or to another packet processor to be processed.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
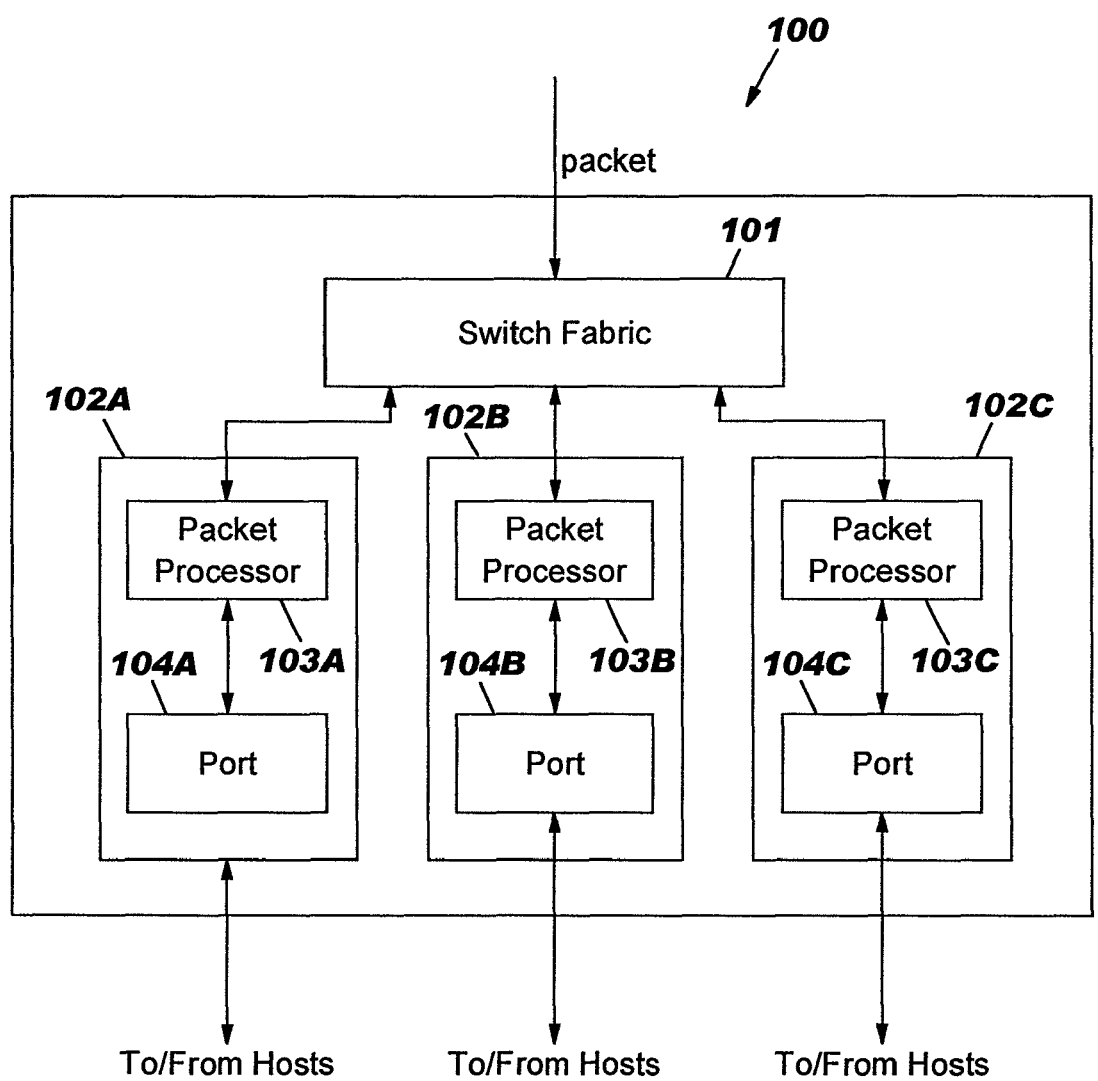
FIG. 1 illustrates a switch in a packet switching network configured in accordance with the present invention.

FIG. 1—Switch in a Packet Switching Network

FIG. 1 illustrates an embodiment of a switch 100 in a packet switching network. Switch 100 may be configured to receive packets of data that may be directed to another particular switch 100 or host (not shown) in the packet switching network. Switch 100 may comprise a switch fabric 101 configured to direct the incoming packets of data to particular blades 102A-C coupled to switch fabric 101. Blade 102A may comprise a packet processor 103A coupled with ports 104A. Blades 102B and 102C are configured similarly to blade 102A. Blades 102A-C may collectively or individually be referred to as blades 102 or blade 102, respectively. Packet processors 103A-C may collectively or individually be referred to as packet processors 103 or packet processor 103, respectively. Ports 104 may collectively or individually be referred to as ports 104 or port 104, respectively. Each port 104 may be coupled with hosts (not shown) or other switches 100. Blades 102 may provide traffic to switch fabric 101 and accept traffic from switch fabric 101. Thus, any host connected with one of blades 102 may communicate with another host connected to another blade 102. It is noted that switch 100 may comprise any number of blades 102 and each blade 102 may comprise any number of packet processors 103 and ports 104 and that FIG. 1 is illustrative.

Figure 2:
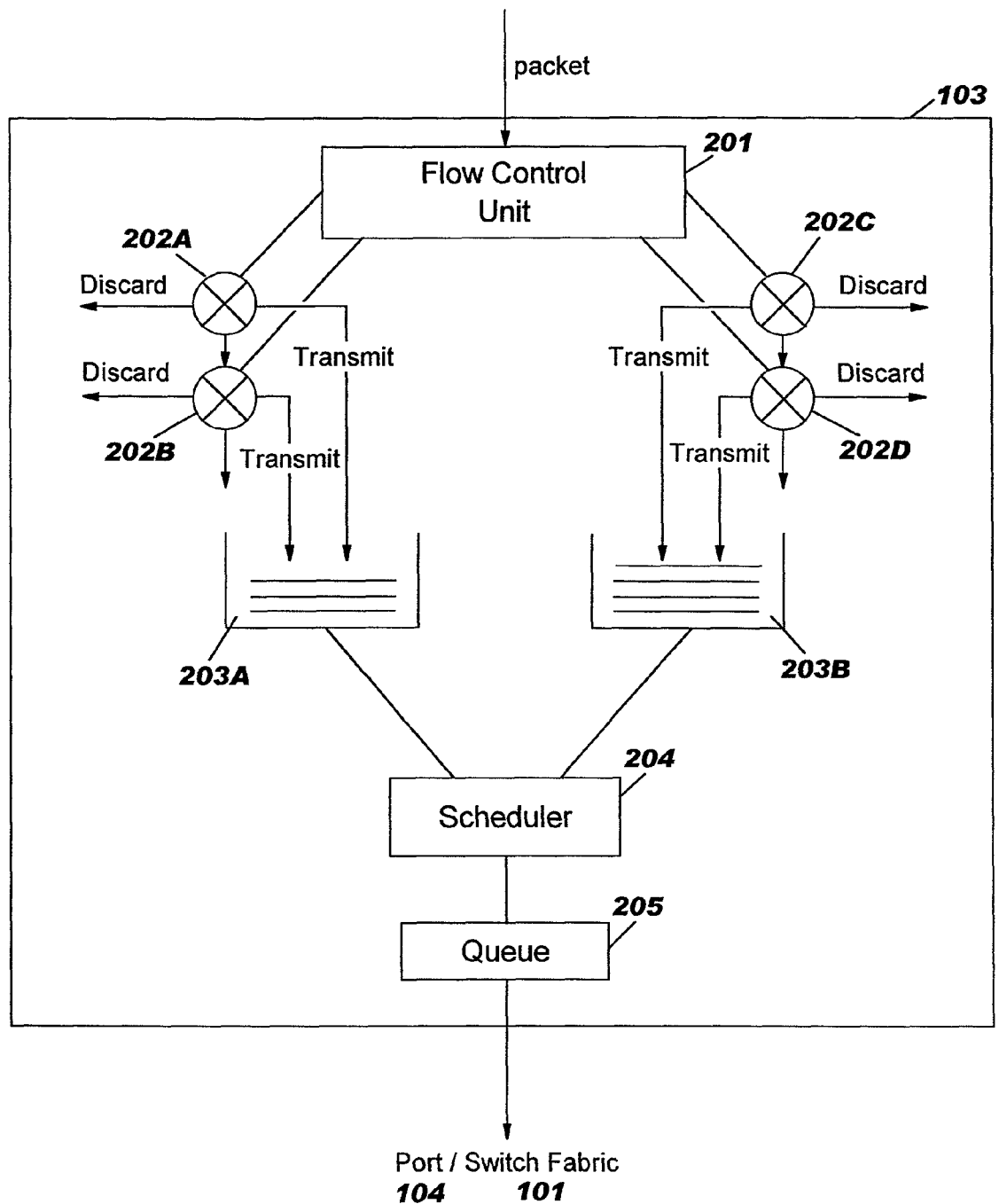
FIG. 2 illustrates a packet processor in the switch configured in accordance with the present invention.

FIG. 2—Packet Processor

FIG. 2 illustrates an embodiment of the present invention of packet processor 103. Packet processor 103 may comprise a flow control unit 201 configured to receive packets of data. As further described below, flow control unit 201 may further be configured to direct appropriate received packets to appropriate flow controllers 202A-D (denoted by circles with X's) in FIG. 2. Flow controllers 202A-D may collectively or individually be referred to as flow controllers 202 or flow controller 202, respectively. Packet processor 103 may further comprise queues 203A-B, e.g., First-In-First-Out (FIFO) queues, configured to store packets that are transmitted from flow controllers 202A-D as described further below. Queues 203A-B may collectively or individually be referred to as queues 203 or queue 203, respectively. Packet processor 103 may further comprise a scheduler 204 coupled to queues 203A-B and a queue 205 coupled to scheduler 204. It is noted that those skilled in the art would appreciate that packet processor 103 may include many additional components that are not shown in FIG. 2 for the purpose of clearly describing the present invention. It is further noted that packet processor may comprise any number of flow controllers 202. It is further noted that FIG. 2 is illustrative and not meant to imply architectural limitations.

Referring to FIG. 2, flow control unit 201 may be configured to determine whether the received packet is a real-time packet or a non-real-time packet based on what may be referred to as a time priority. A time priority may refer to the urgency of processing the received packet by packet processor 103. Packets that are classified as being "urgent" to be processed, e.g., packets containing data for voice, radio, may be referred to as real-time packets. However, packets that are classified as not being urgent to be processed, e.g., packets containing data for electronic mail or backup purposes, x-rays, may be referred to as non-real-time packets. Packets that are classified as real-time packets may be processed by packet processor 103 prior to the packets classified as non-real-time packets. Furthermore, flow control unit 201 may further be configured to determine the value priority associated with the received packet. Each class of packets may be assigned a particular value priority where the value priority may refer to the rank or priority of the class of packets to be processed by processor 103. Packets with a higher value priority may be processed preferentially to packets with a lower value priority with the same time priority as described briefly further below. Additional details regarding value priorities are disclosed in U.S. application Ser. No. 09/448,197 filed on Nov. 23, 1999, entitled "Method and System for Providing Differentiated Services in Computer Networks," Attorney Docket No. RAL9-99-0138, which is hereby incorporated herein by reference in its entirety. In one embodiment, flow control unit 201 may be configured to determine the time priority (real-time or non-real-time) and then the value priority (0, 1, . . . ) of a received packet by determining the value of particular bits in the packet header of the received packet.

Flow control unit 201 may further be configured to direct the received packet to an appropriate flow controller 202A-D (denoted by circles with X's) in FIG. 2. Flow controllers 202 may be configured to determine whether to discard or transmit the received packet as described briefly further below. Each flow controller 202 may be associated with a particular class of packets associated with a particular value priority and a particular time priority, e.g., real-time, non-real-time. For example, flow controller 202A may be associated with a class of packets, e.g., packets containing voice data, with a value priority of 0 (the highest possible) and a time priority for real-time packets. Flow controller 202B may be associated with a class of packets, e.g., packets containing streaming radio broadcast data, with a value priority of 1 (the second highest possible after value priority of 0) and a time priority for real-time packets. Flow controller 202C may be associated with a class of packets, e.g., packets containing x-ray data, with a value priority of 0 and a time priority for non-real-time packets. Flow controller 202D may be associated with a class of packets, e.g., packets containing electronic mail data, with a value priority of 1 and a time priority for non-real-time packets.

As stated above, flow controller 202 may be configured to determine whether to discard or transmit the received packet of data. Each flow controller 202 may be configured to generate a particular transmit probability. The transmit probability may refer to the probability of transmitting packets or bits. As the packet is received by flow controller 202, flow controller 202 may be configured to fetch a random number from a table (not shown) which may then be compared with the generated transmit probability. If the transmit probability is greater than or equal to the random number, then the packet may be inserted in a queue 203A, 203B. If the transmit probability is less than the random number, then the packet is discarded. Flow controller 202 may be configured to discard a real-time packet or insert a real-time packet in queue 203A based upon its value priority, the minimum and maximum rates for that value priority and the current queue 203A congestion conditions. Furthermore, flow controller 202 may be configured to discard a non-real-time packet or insert a non-real-time packet in queue 203B based upon its value priority, the minimum and maximum rates for that value priority and the current queue 203B congestion conditions. Additional details regarding flow controllers 202 are disclosed in U.S. application Ser. No. 09/448,197 filed on Nov. 23, 1999, entitled "Method and System for Providing Differentiated Services in Computer Networks," Attorney Docket No. RAL9-99-0138.

The rate flow controller 202 transmits packets to a queue 203A, 203B, commonly referred to as a "flow rate", may be periodically updated. That is, the number of packets transmitted by flow controller 202 within a particular period of time to a queue 203A, 203B may be periodically updated. The transmit probability may be increased linearly if the flow rate or a smoothed measure of the flow rate is less than or equal to a minimum rate of transmission. The minimum rate of transmission may refer to a minimum number of packets or bits per unit of time of a particular class with the same time and value priority to be transmitted by an associated flow controller 202 to a queue 203A, 203B. However, the transmit probability may be decreased exponentially if the flow rate or a smoothed measure of the flow rate is greater than a maximum rate of transmission. The maximum rate of transmission may refer to a maximum number of packets or bits per unit of time of a particular class to be transmitted by an associated flow controller 202 to a queue 203A, 203B. If the flow rate or a smoothed measure of the flow rate is between a minimum and maximum rate of transmission and there is available space in the queue 203A, 203B receiving the transmitted packets, the transmit probability is linearly increased. However, if the flow rate is between a minimum and maximum rate of transmission and there is not available space in the queue 203A, 203B receiving the transmitted packets, the transmit probability is exponentially decreased. By linearly increasing the transmit probability as described above at different rates for each flow controller 202, packets with a higher value priority may be able to acquire bandwidth faster when it becomes available than packets with a lower value priority. Furthermore, by exponentially decreasing the transmit probability as described above at different rates for each flow controller 202, packets with a higher value priority may be able to release bandwidth slower when it becomes scarce than packets with a lower value priority. Additional details regarding updating the flow rate are disclosed in U.S. application Ser. No. 09/448, 197 filed on Nov. 23, 1999, entitled "Method and System for Providing Differentiated Services in Computer Networks," Attorney Docket No. RAL9-99-0138.

As stated above, if the transmit probability is greater than or equal to the random number, then flow controller 202 may insert the received packet to a queue 203A, 203B. Flow controllers 202, e.g., flow controllers 202A-B, associated with a class of packets with a time priority for real-time packets, transmit the received packets to real-time queue 203A. Flow controllers 202, e.g., flow controllers 202C-D, associated with a class of packets with a time priority for non-real-time packets, transmit the received packets to non-real-time queue 203B. By having queue 203A designated to store real-time packets and queue 203B designated to store non-real-time packets, a simpler scheduler, such as scheduler 204 illustrated in FIG. 2, may be implemented than the scheduler implemented in prior art.

As stated in the Background Information section, packets are typically assigned a priority where the priority may be determined based on particular bits in the packet header. The packets with a higher priority may be processed prior to the packets with a lower priority. After each particular interval of time, a scheduler may be configured to search through all the queues storing packets and identify the packet with the highest priority to be transmitted. However, in order for the scheduler to search through all the queues storing packets and identify the packet with the highest priority to be transmitted, the scheduler may be complex to implement such as by having multiple sub-queues and logic for identifying multiple priorities. It would therefore be desirable to implement a simpler scheduler without the complexity in design of having multiple sub-queues and logic for identifying multiple priorities in order to identify the packet to be transmitted. By separately storing real-time packets and non-real-time packets in separate queues 203 while assigning a higher priority to real-time packets than non-real-time packets, a simpler scheduler may be implemented.

As stated above, real-time packets are assigned a higher time priority than non-real-time packets thereby requiring real-time packets to be processed prior to non-real-time packets. Scheduler 204 may be configured to first determine if there are any real-time packets in real-time queue 203A. If there are any real-time packets in real-time queue 203A, then scheduler 204 may be configured to select the next real-time packet, e.g., the next real-time packet in the real-time FIFO queue 203A, to be enqueued in queue 204 for transmission to port 104 (FIG. 1) or switch fabric 101 (FIG. 1). If there are no real-time packets in real-time queue 203A, then scheduler 204 may be configured to select the next non-real-time packet, e.g., the next non-real time packet in the non-real-time FIFO queue 203B, to be enqueued in queue 204 for transmission to port 104 or switch fabric 101. If there are no real-time packets in real-time queue 203A and no non-real-time packets in non-real-time queue 203B, then scheduler 204 may wait for the next real-time or non-real-time packet to be inserted in their respective queue 203. By storing the higher time priority real-time packets in a separate queue 203 than the lower time priority non-real-time packets, scheduler 204 does not have to search through all the queues to identify the packet with the highest time priority as in prior art. Hence, scheduler 204 may be simpler in design than the scheduler in prior art. It is noted that schedulers are well known in prior art and that a person of ordinary skill in the art would be capable of designing a simpler scheduler that searches queues 203A-B as described above instead of searching each queue in the system for the highest priority packet. It is further noted that such embodiments implementing a simpler design of a scheduler would fall within the scope of the present invention.

Upon enquing the selected packet in queue 205, the selected packet may be transmitted to either port 104 for further transmission to another switch 100 (FIG. 1) or host or to switch fabric 101 to be transmitted to another packet processor 103 to be processed.

By separating packets that may be classified as real-time and non-real-time into separate queues 203 and assigning real-time packets a higher priority than non-real-time packets as discussed above, the latency for processing real-time packets by packet processor 103 may be calculated. The latency for processing real-time packets may be calculated since the latency for real-time packets depends only on real-time traffic; whereas, the latency for non-real-time packets depends on both real-time and non-real-time traffic. The latency for real-time packets depends only on real-time traffic since real-time packets are assigned a higher priority than non-real-time packets. For example, suppose each packet received by packet processor 103 is 1,000 bits long. If the processing rate of packet processor 103 is 1 gigabit/second, then packet processor 103 may be able to process a packet in 1 microsecond. If there are four flow controllers 202 associated with four different value priorities for real-time packets, then a maximum latency for processing real-time packets may occur when four real-time packets with corresponding four different value priorities arrive concurrently at packet processor 103. The maximum latency may then be 3 microseconds corresponding to the time to process three packets prior to processing the fourth received real-time packet. Similarly, an upper limit on jitter for real-time packets may be calculated.

In regards to practicing the principles of the present invention as described, a few principles emerge as discussed below. The sum of a maximum rate of packets or bits for each class associated with real-time packets to be transmitted by an appropriate flow controller 202 to queue 203A must be less than the processing capacity of packet processor 103. Furthermore, the sum of a maximum rate of packets or bits for each class associated with real-time packets to be transmitted by an appropriate flow controller 202 to queue 203A plus the sum of a minimum rate of packets or bits for each class associated with non-real-time packets to be transmitted by an appropriate flow controller 202 to queue 203B must be less than the processing capacity of packet processor 103 as illustrated in Table 1 as shown below. It is noted that "packets" may be a constant or variable size.

| Class | Priority Value | Minimum | Maximum | Offered | Transmitted |
|---|---|---|---|---|---|
| RT | 0 | 20 | 40 | 50 | 40 |
| RT | 1 | 0 | 10 | 5 | 5 |
| NRT | 0 | 20 | 40 | 30 | 30 |
| NRT | 1 | 0 | 100 | 100 | 25 |

As shown above, Table 1 has a column entitled "class" representing the class of received packets, e.g., real-time packets, non-real-time packets. Table 1 further has a column entitled "priority value" referring to the priority value assigned to the class of packets where priority value 0 has a higher priority than priority value 1. The column entitled "minimum" may represent the minimum rate of packets or bits with that time and value priority that must be transmitted by the appropriate flow controller 202 to the appropriate queue 203. The column entitled "maximum" may represent the maximum rate of packets or bits with that time and value priority that may be transmitted by the appropriate flow controller 202 to the appropriate queue 203. The column entitled "offered" may refer to the rate of packets or bits associated with a particular priority value and class that were received by the appropriate flow controller 202. The column entitled "transmitted" may refer to the ideal rate of packets associated with a particular time and value priority that are to be transmitted by the appropriate flow controller 202 to the appropriate queue 203 using the principles of the present invention as described above.

As illustrated in Table 1, assuming that the processing capacity of processor 103 is to process packets at the rate of 100 units of data per time unit, the maximum rate of transmission for real-time traffic with a value priority 0 (maximum value) was enabled and transmitted to queue 203A. Furthermore, the offered rate for real-time traffic with a value priority of 1 (less than its maximum) was enabled and transmitted to queue 203A. Furthermore, Table 1 shows that the offered rate for non-real-time time traffic with a value priority of 0 was enabled and transmitted to queue 203B. Finally, the rate for non-real-time traffic with a value priority of 1 was the remaining bandwidth, e.g., 25 units of data. In all flows, at least the minimum rate was transmitted. By assigning a higher scheduler service priority to real-time packets than non-real-time packets, the number of real-time packets or bits received up to the maximum rate of real-time packets or bits for each priority value may be processed by packet processor 103. Furthermore, by assigning a higher priority to real-time packets than non-real-time packets, at least the minimum rate of non-real-time packets or bits received for each priority value may be processed by packet processor 103.

Another principle that emerges from practicing the principles of the present invention is the following. As stated above, the flow rate of flow controller 202 (designated as fi(t)) may refer to the rate that packets or bits are transmitted by flow controller 202 to queue 203 within a particular period of time (designated as Dt). The flow rate fi(t) may depend upon the transmit probability (designated as Ti(t)) where the transmit probability may refer to the probability of transmitting packets or bits. Hence, future flow rates fi(t) may vary depending upon the transmit probability Ti(t). If the flow rate or a smoothed measure of the flow rate fi(t) is less than the minimum rate of packets or bits to be transmitted by an associated flow controller 202, e.g., flow controller 202A, to the appropriate queue 203, e.g., queue 203A, then the transmit probability may be linearly increased such as up to a maximum value of 1. For example, the transmit probability may be linearly increased by $1/16$ up to a maximum value of 1 as shown in the following equation:

$$Ti(t+Dt)=\text{minimum}\{1, Ti(t)+1/16\} \quad (EQ1)$$

If the flow rate or a smoothed measure of the flow rate fi(t) is greater than the maximum rate of packets or bits to be transmitted by an associated flow controller 202, e.g., flow controller 202A, to the appropriate queue 203, e.g., queue 203A, then the transmit probability may be exponentially decreased. For example, the transmit probability may be exponentially decreased as shown in the following equation:

$$Ti(t+Dt)=Ti(t)*31/32 \quad (EQ2)$$

If the flow rate or a smoothed measure of the flow rate fi(t) is between the minimum and maximum rate of packets or bits to be transmitted by an associated flow controller 202, e.g., flow controller 202A, to the appropriate queue 203, e.g., queue 203A, then the transmit probability may be linearly increased such as up to a maximum value of 1 if there is excess bandwidth. For real-time traffic, excess bandwidth may refer to available space in real-time queue 203A to store real-time packets. For non-real-time traffic, excess bandwidth may refer to available space in both real-time queue 203A and non-real-time queue 203B to store real-time packets and non-real-time packets, respectively. As stated above, the transmit probability may be linearly increased such as up to a maximum value of 1 if there is excess bandwidth. For example, the transmit probability may be linearly increased by Ci up to a maximum value of 1 as shown in the following equation:

$$Ti(t+Dt)=\text{minimum}\{1, Ti(t)+Ci\} \quad (EQ3)$$

where Ci is a particular constant dependent upon the value priority associated with the flow controller 202.

If the flow rate or a smoothed measure of the flow rate fi(t) is between the minimum and maximum rate of packets or bits to be transmitted by an associated flow controller 202, e.g., flow controller 202A, to the appropriate queue 203, e.g., queue 203A, then the transmit probability may be exponentially decreased if there is nonexistent excess bandwidth. For real-time traffic, nonexistent excess bandwidth may refer to not having available space in real-time queue 203A to store real-time packets. For non-real-time traffic, nonexistent excess bandwidth may refer to not having available space in both real-time queue 203A and non-real-time queue 203B to store real-time packets and non-real-time packets, respectively. As stated above, the transmit probability may be exponentially decreased if there is nonexistent excess bandwidth. For example, the transmit probability may be exponentially decreased as shown in the following equation:

$$Ti(t+Dt)=\text{maximum}\{0, Ti(t)-Di*fi(t)/S\} \quad (EQ4)$$

where S is the maximum possible transmission rate or arrival rate for packet processor 103; where Di is a particular constant dependent upon the value priority associated with flow controller 202.

Referring to FIG. 2, flow control unit 201 may be configured in one embodiment to comprise a memory (not shown), e.g., non-volatile memory, to store a program to perform at least some of the steps of a method for transmitting packets in a packet switching network as described below in conjunction with FIG. 3. Flow control unit 201 may further comprise a processor (not shown), e.g., central processing unit, coupled to the memory (not shown). The processor (not shown) may be configured to execute the instructions of the program. It is further noted that the steps of the method performed by the program mentioned above may in an alternative embodiment be implemented in hardware such as in an Application Specific Integrated Circuit (ASIC).

Figure 3:
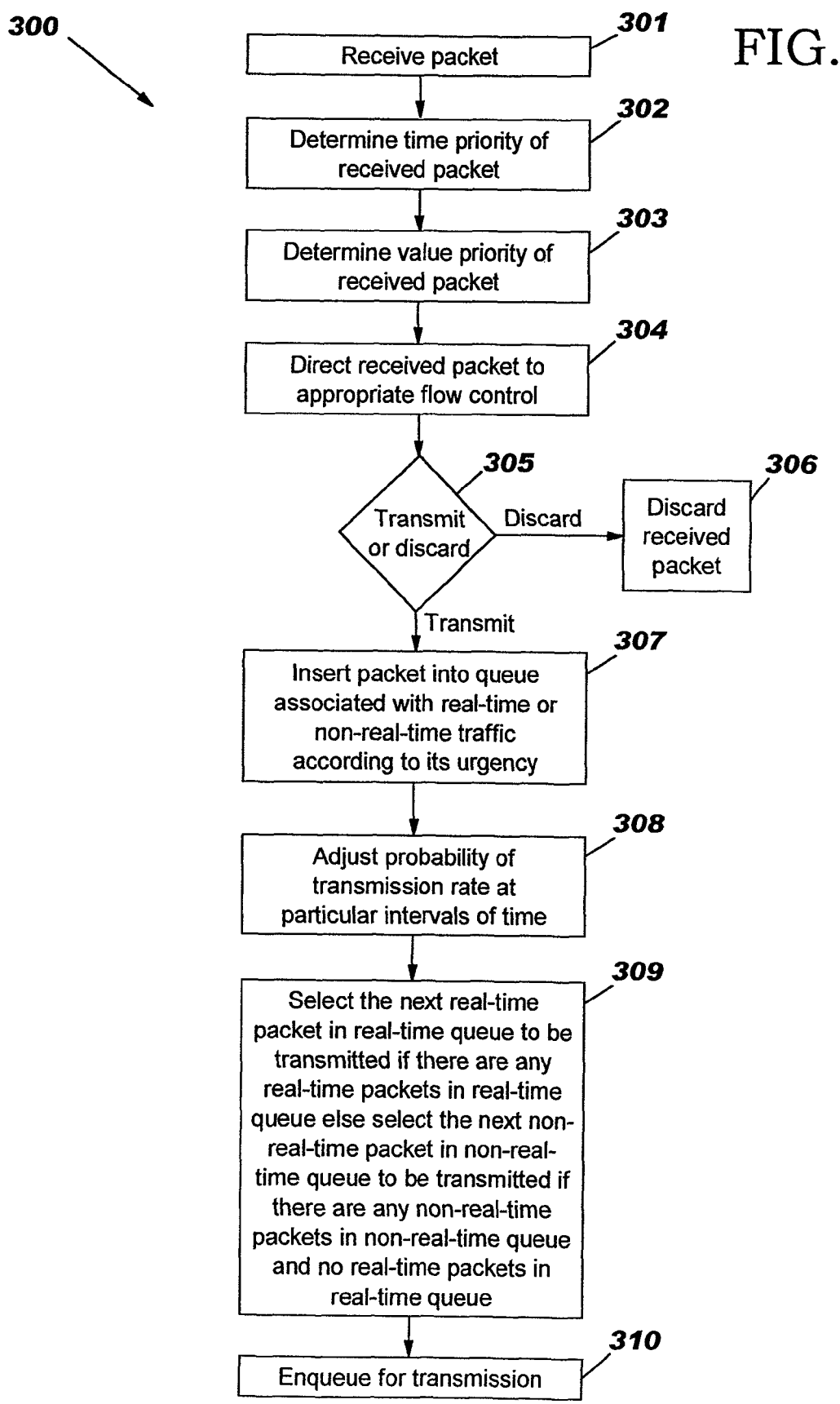
FIG. 3 is a flowchart of a method for transmitting packets in a packet switching network in accordance with the present invention.

FIG. 3—Method for Transmitting Packets in a Packet Switching Network

FIG. 3 is a flowchart of one embodiment of the present invention of a method 300 for transmitting packets in a packet switching network where a simpler scheduler in a packet processor may be designed than in prior art. As stated in the Background Information section, packets are assigned a priority where the priority may be determined based on particular bits in the packet header. The packets with a higher priority may be processed prior to the packets with a lower priority. After each particular interval of time, a scheduler may be configured to search through all the queues storing packets and identify the packet with the highest priority to be transmitted. However, in order for the scheduler to search through all the queues storing packets and identify the packet with the highest priority to be transmitted, the scheduler may be complex to implement such as by having multiple sub-queues and logic for identifying multiple priorities. It would therefore be desirable to implement a simpler scheduler without the complexity in design of having multiple sub-queues and logic for identifying multiple priorities in order to identify the packet to be transmitted. Method 300 is a method for transmitting packets in a packet switching network where a simpler scheduler in a packet processor may be designed than in prior art.

Referring to FIG. 3, in conjunction with FIGS. 1 and 2, in step 301, packet processor 103 may receive a packet of data. In step 302, a determination may be made by flow control unit 201 as to the time priority of the received packet. That is, a determination may be made by flow control unit 201 as to whether the received packet is a real-time packet or a non-real-time packet. In one embodiment, flow control unit 201 may determine whether the received packet is a real-time packet or a non-real-time packet based on the value of particular bits in the packet header of the received packet. As stated above, real-time packets may refer to packets that are classified as being "urgent" to be processed, e.g., packets containing data for voice, radio. Non-real-time packets may refer to packets that are classified as being "not urgent" to be processed, e.g., packets containing data for electronic mail, x-rays, Internet, for backup storage.

In step 303, the value priority of the received packet may be determined by flow control unit 201. As stated above, the value priority may refer to the rank or priority assigned to a class of packets. Packets assigned a higher priority value with a particular time priority, e.g., real-time, non-real-time, may be processed by packet processor 103 prior to packets assigned a lower priority value with the same time priority. In one embodiment, flow control unit 201 may determine the value priority of the received packet based on the value of particular bits in the packet header of the received packet.

In step 304, flow control unit 201 may direct the received packet to an appropriate flow controller 202. Each flow controller 202 may be associated with a particular class of packets assigned with a particular value priority and time priority, e.g., real-time, non-real-time. For example, referring to FIG. 2, flow controller 202A may be associated with a class of packets, e.g., packets containing voice data, with a value priority of 0 (the highest possible) and a time priority for real-time packets. Flow controller 202B may be associated with a class of packets, e.g., packets containing radio data, with a value priority of 1 (the second highest possible after value priority of 0) and a time priority for real-time packets. Flow controller 202C may be associated with a class of packets, e.g., packets containing x-ray data, with a value priority of 0 and a time priority for non-real-time packets. Flow controller 202D may be associated with a class of packets, e.g., packets containing electronic mail data, with a value priority of 1 and a time priority for non-real-time packets.

In step 305, a determination may be made by the appropriate flow controller 202 as to whether to transmit or discard the received packet. As stated above, each flow controller 202 may be configured to generate a particular transmit probability. As the packet is received by flow controller 202, flow controller 202 may be configured to fetch a random number (value from 0 to 1) from a table (not shown) which may then be compared with the generated transmit probability. In this manner, a determination may be made by flow controller 202 as to whether to transmit or discard the received real-time packet. If the transmit probability is less than the random number, then the received real-time packet is discarded in step 306. If the transmit probability is greater than or equal to the random number, then the received packet is inserted in the appropriate queue 203 in step 307. If the received packet is a real-time packet, then if the transmit probability is greater than or equal to the random number the received packet is inserted in real-time queue 203A in step 307. If the received packet is a non-real-time packet, then if the transmit probability is greater than or equal to the random number, the received packet is inserted in non-real-time queue 203B in step 307.

In step 308, a background process may be implemented by flow control unit 201 to adjust the probability of the transmission rate at particular intervals of time as discussed above. It is noted that the background process in step 308 may occur during any step of method 300 and that presenting the implementation of the background process in step 308 is illustrative.

In step 309, scheduler 204 may select the next real-time packet in real-time queue 203A to be transmitted if there are any real-time packets in real-time queue 203A. However, if there are no real-time packets in real-time queue 203A, then scheduler 204 may select the next non-real-time packet in non-real-time queue 203B to be transmitted if there are any non-real-time packets in non-real-time queue 203B. If there are no real-time packets in real-time queue 203A and no non-real-time packets in non-real-time queue 203B, then scheduler 204 may wait for the next real-time or non-real-time packet to be inserted in their respective queue 203. By storing the higher priority real-time packets in a separate queue 203 than the lower priority non-real-time packets, scheduler 204 does not have to search through all the queues to identify the packet with the highest priority as in prior art. Hence, scheduler 204 may be simpler in design than the scheduler in prior art.

In step 310, the packet selected in step 309 may then be enqueued in queue 205 for transmission to either port 104 for further transmission to another switch 100 (FIG. 1) or host or to switch fabric 101 to be transmitted to another packet processor 103 to be processed.

It is noted that steps 301-304 and 308 may be implemented by a program residing in memory in flow control unit 201. It is further noted that steps 301-304 and 308 may be implemented in hardware in flow control unit 201. It is further noted that steps 305-307 may be implemented in software or hardware by flow controller 202. It is further noted that steps 309-310 may be implemented in software or hardware by scheduler 204. It is further noted that method 300 may be executed in a different order presented and that the order presented in the discussion of FIG. 3 is illustrative. It is further noted that certain steps in FIG. 3 may be executed almost concurrently.

Although the system and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A switch, comprising:

a switch fabric; and a packet processor coupled to said switch fabric, wherein said packet processor is configured to direct data across said switch fabric to another packet processor, wherein said packet processor comprises:

a first queue configured to store real-time data; and a second queue configured to store non-real-time data;

wherein said packet processor further comprises:

a flow control unit coupled to said first queue and said second queue, wherein said flow control unit comprises:

a memory unit operable for storing a computer program operable for transmitting data in a packet switching network; and a processor coupled to said memory unit, wherein said processor, responsive to said computer program, comprises:

circuitry operable for receiving data;

circuitry operable for determining if said received data is one of a real-time data and a non-real-time data, wherein said real-time data has a higher priority of transmission than said non-real-time data; and circuitry operable for inserting said received data into one of said first queue and said second queue, wherein said received data is inserted in said first queue if said received data is said real-time data, wherein said received data is inserted in said second queue if said received data is said non-real-time data;

wherein said first queue is configured to store real-time data associated with one or more priorities, wherein a maximum rate of data is to be transmitted to said first queue for each value priority associated with said real-time data, wherein a sum of maximum rates of data to be transmitted to said first queue for each value priority associated with said real-time data is less than or equal to a maximum rate of data to be processed by said packet processor.

2. A switch, comprising:

a switch fabric; and a packet processor coupled to said switch fabric, wherein said packet processor is configured to direct data across said switch fabric to another packet processor, wherein said packet processor comprises:
- a first queue configured to store real-time data; and
- a second queue configured to store non-real-time data;

wherein said packet processor further comprises:
- a flow control unit coupled to said first queue and said second queue, wherein said flow control unit comprises:
  - a memory unit operable for storing a computer program operable for transmitting data in a packet switching network; and
  - a processor coupled to said memory unit, wherein said processor, responsive to said computer program, comprises:
    - circuitry operable for receiving data;
    - circuitry operable for determining if said received data is one of a real-time data and a non-real-time data, wherein said real-time data has a higher priority of transmission than said non-real-time data; and
    - circuitry operable for inserting said received data into one of said first queue and said second queue, wherein said received data is inserted in said first queue if said received data is said real-time data, wherein said received data is inserted in said second queue if said received data is said non-real-time data;

wherein said first queue is configured to store real-time data associated with one or more priorities, wherein a maximum rate of data is to be transmitted to said first queue for each value priority associated with said real-time data, wherein said second queue is configured to store non-real-time data associated with one or more priorities, wherein a minimum rate of data is to be transmitted to said second queue for each value priority associated with said non-real-time data, wherein a sum of maximum rates of data to be transmitted to said first queue for each value priority associated with said real-time data plus a sum of minimum rates of data to be transmitted to said second queue for each value priority associated with said non-real-time data is less than or equal to a maximum rate of data to be processed by said packet processor.

3. A switch, comprising:

a switch fabric; and a packet processor coupled to said switch fabric, wherein said packet processor is configured to direct data across said switch fabric to another packet processor, wherein said packet processor comprises:
- a first queue configured to store real-time data; and
- a second queue configured to store non-real-time data;

wherein said packet processor further comprises:
- a flow control unit coupled to said first queue and said second queue, wherein said flow control unit is configured to receive data, wherein said flow control unit is further configured to determine if said received data is one of a real-time data and a non-real-time data, wherein said real-time data has a higher priority of transmission than said non-real-time data, wherein said flow control unit is further configured to insert said received data into one of said first queue and said second queue, wherein said received data is inserted in said first queue if said received data is said real-time data, wherein said received data is inserted in said second queue if said received data is said non-real-time data;

wherein said first queue is configured to store real-time data associated with one or more priorities, wherein a maximum rate of data is to be transmitted to said first queue for each value priority associated with said real-time data, wherein a sum of maximum rates of data to be transmitted to said first queue for each value priority associated with said real-time data is less than or equal to a maximum rate of data to be processed by said packet processor.

4. A switch, comprising:

a switch fabric; and a packet processor coupled to said switch fabric, wherein said packet processor is configured to direct data across said switch fabric to another packet processor, wherein said packet processor comprises:
- a first queue configured to store real-time data; and
- a second queue configured to store non-real-time data;

wherein said packet processor further comprises:
- a flow control unit coupled to said first queue and said second queue, wherein said flow control unit is configured to receive data, wherein said flow control unit is further configured to determine if said received data is one of a real-time data and a non-real-time data, wherein said real-time data has a higher priority of transmission than said non-real-time data, wherein said flow control unit is further configured to insert said received data into one of said first queue and said second queue, wherein said received data is inserted in said first queue if said received data is said real-time data, wherein said received data is inserted in said second queue if said received data is said non-real-time data;

wherein said first queue is configured to store real-time data associated with one or more priorities, wherein a maximum rate of data is to be transmitted to said first queue for each value priority associated with said real-time data, wherein said second queue is configured to store non-real-time data associated with one or more priorities, wherein a minimum rate of data is to be transmitted to said second queue for each value priority associated with said non-real-time data, wherein a sum of maximum rates of data to be transmitted to said first queue for each value priority associated with said real-time data plus a sum of minimum rates of data to be transmitted to said second queue for each value priority associated with said non-real-time data is less than or equal to a maximum rate of data to be processed by said packet processor.

5. A packet processor, comprising:

a first queue configured to store real-time data;

a second queue configured to store non-real-time data; and a flow control unit coupled to said first queue and said second queue, wherein said flow control unit is configured to receive data, wherein said flow control unit is further configured to determine if said received data is one of a real-time data and a non-real-time data, wherein said real-time data has a higher priority of transmission than said non-real-time data, wherein said flow control unit is further configured to insert said received data into one of said first queue and said second queue, wherein said received data is inserted in said first queue if said received data is said real-time data, wherein said received data is inserted in said second queue if said received data is said non-real-time data;

wherein said first queue is configured to store real-time data associated with one or more priorities, wherein a maximum rate of data is to be transmitted to said first queue for each value priority associated with said real-time data, wherein a sum of maximum rates of data to be transmitted to said first queue for each value priority associated with said real-time data is less than or equal to a maximum rate of data to be processed by said packet processor.

6. A packet processor, comprising:

a first queue configured to store real-time data;

a second queue configured to store non-real-time data; and a flow control unit coupled to said first queue and said second queue, wherein said flow control unit is configured to receive data, wherein said flow control unit is further configured to determine if said received data is one of a real-time data and a non-real-time data, wherein said real-time data has a higher priority of transmission than said non-real-time data, wherein said flow control unit is further configured to insert said received data into one of said first queue and said second queue, wherein said received data is inserted in said first queue if said received data is said real-time data, wherein said received data is inserted in said second queue if said received data is said non-real-time data;

wherein said first queue is configured to store real-time data associated with one or more priorities, wherein a maximum rate of data is to be transmitted to said first queue for each value priority associated with said real-time data, wherein said second queue is configured to store non-real-time data associated with one or more priorities, wherein a minimum rate of data is to be transmitted to said second queue for each value priority associated with said non-real-time data, wherein a sum of maximum rates of data to be transmitted to said first queue for each value priority associated with said real-time data plus a sum of minimum rates of data to be transmitted to said second queue for each value priority associated with said non-real-time data is less than or equal to a maximum rate of data to be processed by said packet processor.

7. A program stored in a memory, the program causing a processor to execute the instructions of the program for transmitting data in a network comprising the programming steps of:

receiving data;

determining if said received data is one of a real-time data and a non-real-time data, wherein said real-time data has a higher priority of transmission than said non-real-time data; and inserting said received data into one of a first queue and a second queue, wherein said first queue is configured to store real-time data, wherein said second queue is configured to store non-real-time data, wherein said received data is inserted in said first queue if said received data is said real-time data, wherein said received data is inserted in said second queue if said received data is said non-real-time data;

wherein said first queue is configured to store real-time data associated with one or more value priorities, wherein a maximum rate of data is to be transmitted to said first queue for each value priority associated with said real-time data, wherein a sum of maximum rates of data to be transmitted to said first queue for each value priority associated with said real-time data is less than or equal to a maximum rate of data to be processed by said packet processor.

8. A program stored in a memory, the program causing a processor to execute the instructions of the program for transmitting data in a network comprising the programming steps of:

receiving data;

determining if said received data is one of a real-time data and a non-real-time data, wherein said real-time data has a higher priority of transmission than said non-real-time data; and inserting said received data into one of a first queue and a second queue, wherein said first queue is configured to store real-time data, wherein said second queue is configured to store non-real-time data, wherein said received data is inserted in said first queue if said received data is said real-time data, wherein said received data is inserted in said second queue if said received data is said non-real-time data;

wherein said first queue is configured to store real-time data associated with one or more value priorities, wherein a maximum rate of data is to be transmitted to said first queue for each value priority associated with said real-time data, wherein said second queue is configured to store non-real-time data associated with one or more value priorities, wherein a minimum rate of data is to be transmitted to said second queue for each value priority associated with said non-real-time data, wherein a sum of maximum rates of data to be transmitted to said first queue for each value priority associated with said real-time data plus a sum of minimum rates of data to be transmitted to said second queue for each value priority associated with said non-real-time data is less than or equal to a maximum rate of data to be processed by said packet processor.

* * * * *